JOSEPH S. KIRK, OF PITTSBURG, PENNSYLVANIA.

Letters Patent No. 85,313, dated December 29, 1868.

IMPROVEMENT IN FOOD FOR ANIMALS.

The Schedule referred to in these Letters Patent and making part of the same.

*To all whom it may concern:*

Be it known that I, JOSEPH S. KIRK, of Pittsburg, in the county of Allegheny, and State of Pennsylvania, have invented a new and improved Article of Food for Animals; and I do hereby declare that the following is a full and exact description thereof.

The nature of my invention consists in mixing, with ground hay, ground corn, ground oats, or ground barley, or all three of them, always having about two parts of ground hay to one of the other ground ingredients, and pressing them all, when combined, into portable packages, of any desired shape, so as to render them capable of easy handling and transportation.

Grinding hay, instead of cutting it, causes it to lose its original harshness, and makes it a much softer and more easily-masticated food than has been heretofore produced, affording a greater amount of nutriment to all animals, irrespective of age.

Hay, prepared in the manner I propose, is materially reduced in bulk, the facility of transportation thus being increased, and its value, as an article of merchandise, greatly enhanced, it weighing thirty-two and one-half pounds per bushel.

I disclaim the mixing of hay, when cut or crushed, with ground cereals, or the pressing of cut or crushed hay into blocks or packages; but What I do claim as my invention, and desire to secure by Letters Patent, is—

An improved article of food for animals, composed of hay, corn, oats, or barley, or all of them, ground and mixed together in the proportions herein named, and pressed into suitable packages for transportation.

J. S. KIRK.

Witnesses:
GEO. W. MCGILL,
ELI GRANT.